United States Patent [19]
Rouzaud

[11] Patent Number: 5,344,197
[45] Date of Patent: Sep. 6, 1994

[54] SAFETY LOCKING DEVICE HAVING A TILTING HOOK

[75] Inventor: Dominique Rouzaud, Angervilliers, France

[73] Assignee: Messier-Bugatti, Velizy-Villacoublay, France

[21] Appl. No.: 968,403

[22] Filed: Oct. 29, 1992

[30] Foreign Application Priority Data

Nov. 6, 1991 [FR] France .................. 91 13681

[51] Int. Cl.$^5$ .............................................. E05C 5/00
[52] U.S. Cl. .......................................... 292/5; 292/8; 292/201
[58] Field of Search .................... 292/5, 7, 8, 201

[56] References Cited

U.S. PATENT DOCUMENTS

| | | | |
|---|---|---|---|
| 4,470,566 | 9/1984 | Fitzgerald | 292/5 X |
| 4,677,930 | 7/1987 | Ortloff | 292/201 X |
| 5,176,417 | 1/1993 | Bauer | 292/201 |

FOREIGN PATENT DOCUMENTS

| | | | |
|---|---|---|---|
| 0265197 | 10/1987 | European Pat. Off. | |
| 1321314 | 2/1963 | France | 292/5 |
| 2104408 | 8/1971 | France | |
| 432283 | 9/1967 | Switzerland | 292/5 |

Primary Examiner—Rodney M. Lindsey
Attorney, Agent, or Firm—Sixbey, Friedman, Leedom & Ferguson

[57] ABSTRACT

A locking device including a box, a primary latch made in the form of a tilting hook, and a retractable locking member. The locking device further includes a secondary latch made in the form of a sliding member. The sliding member is displaceable between a retracted, open position and an extended, closed position in which the sliding member is in the direct vicinity of an associated catch member. The locking device is particularly applicable to locking the thrust-reversing flaps of aircraft jets.

9 Claims, 2 Drawing Sheets

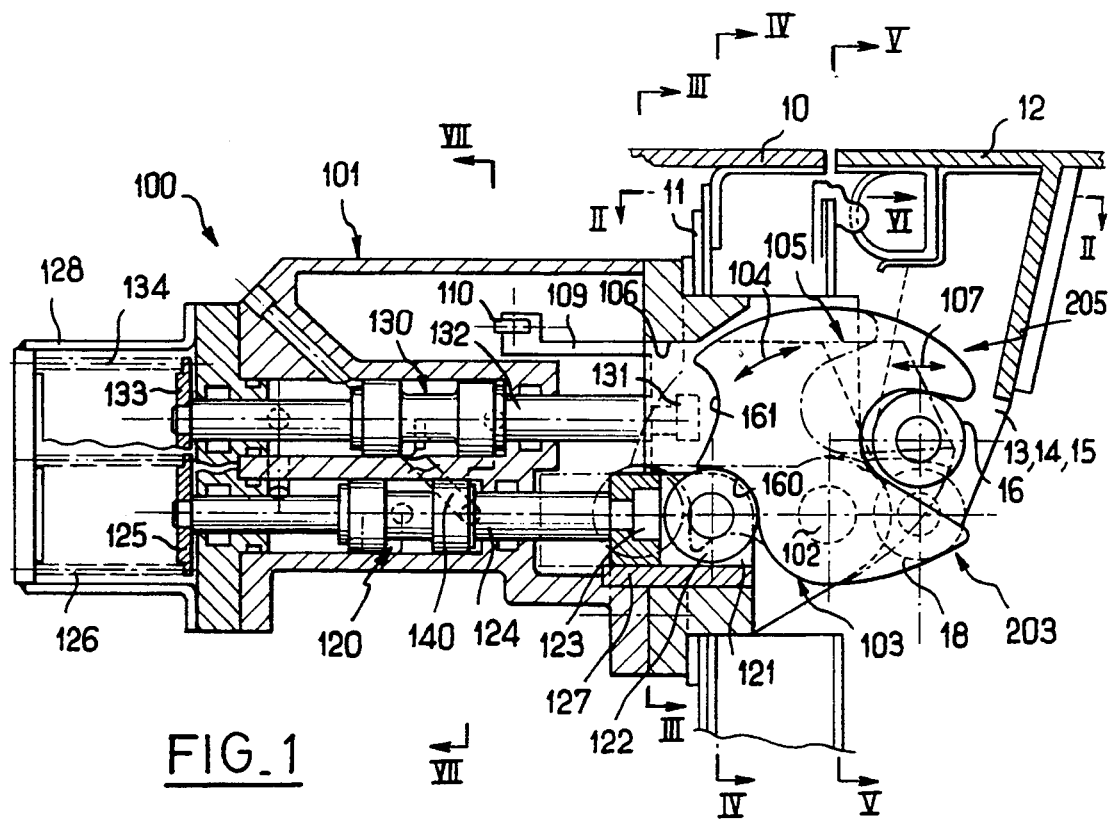
FIG_1
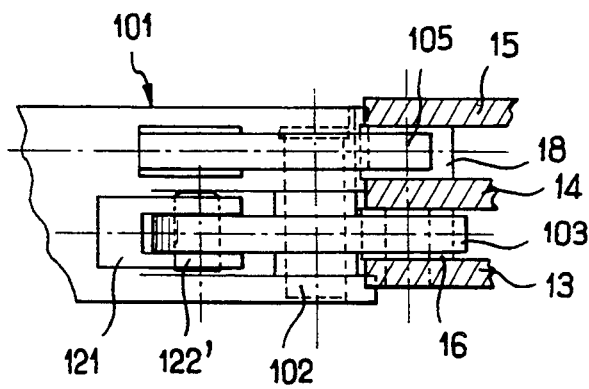
FIG_2
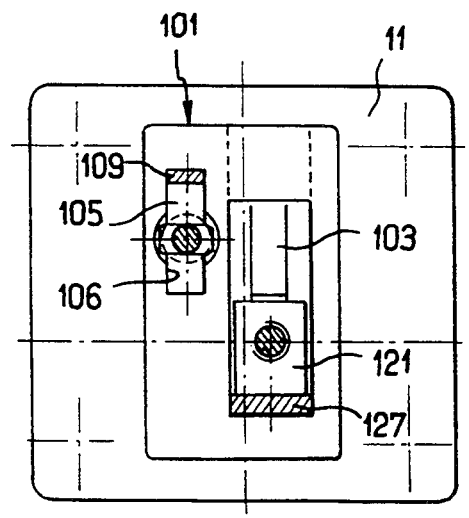
FIG_3

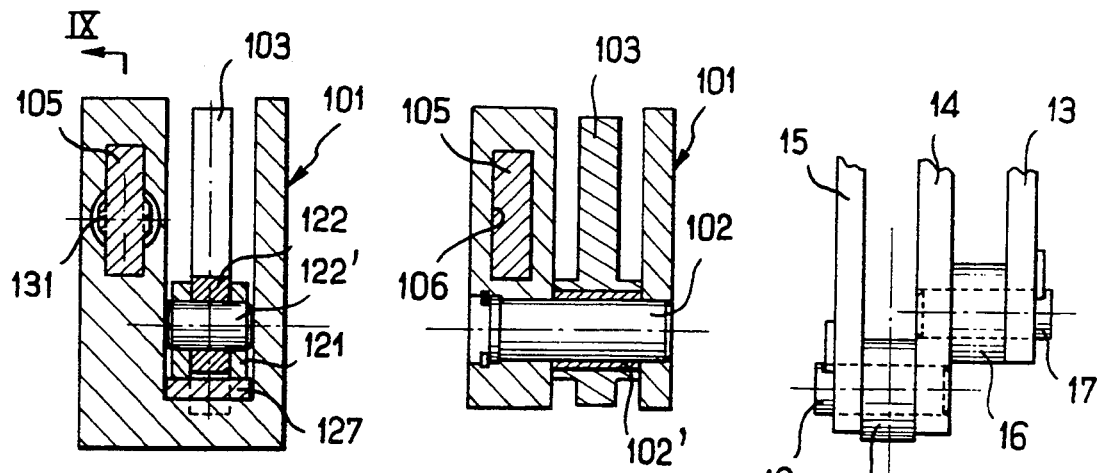
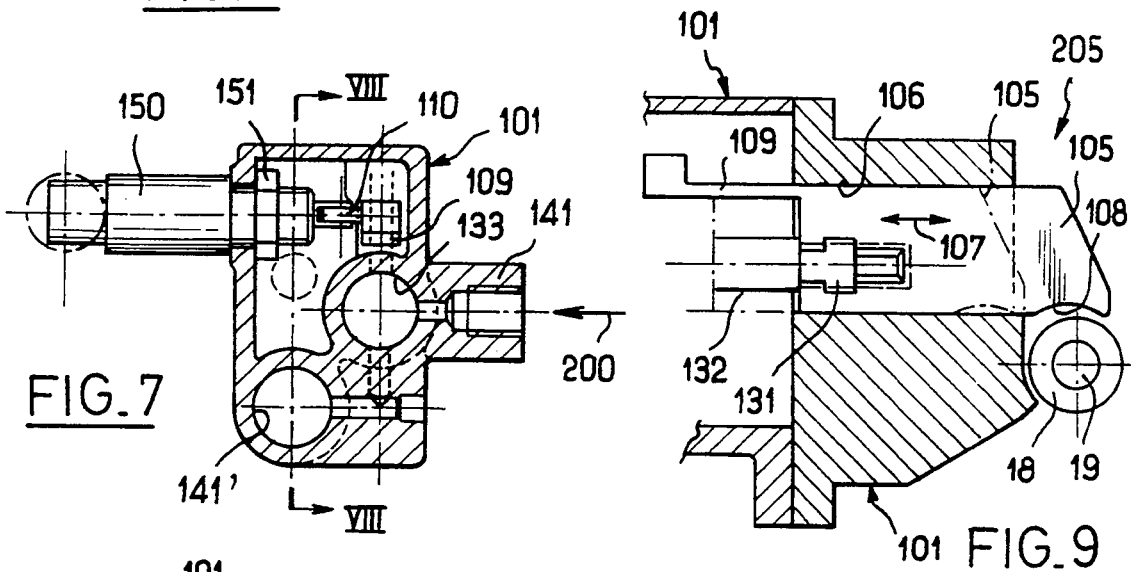
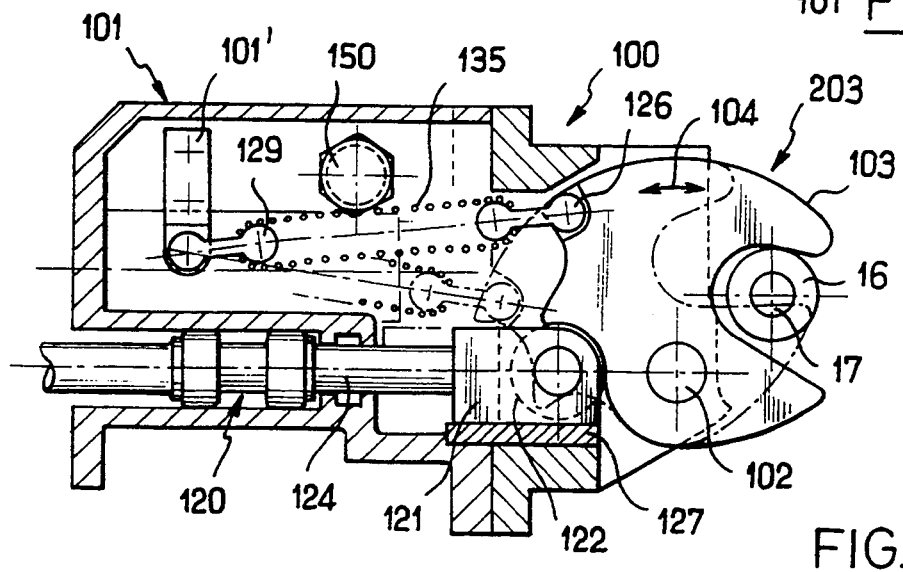

SAFETY LOCKING DEVICE HAVING A TILTING HOOK

The present invention relates to a safety locking device having a tilting hook.

BACKGROUND OF THE INVENTION

Locking devices are known that comprise a box, a latch in the form of a hook that is cantilevered out from a tilt axis carried by said box, and a retractable locking member for opposing tilting movements of the hook while the hook is loaded.

Such a locking device is used, in particular, for locking a door or a shutter in the closed position.

There exist certain applications in which locking must present maximum safety in order to withstand a failure of the locking device with a maximum amount of safety: this applies in particular to locking the thrust-reversing flaps of aircraft jets. In that particular case, a failure of the locking device, e.g. by the hook and/or its tilt axis breaking, would have extremely severe consequences: untimely opening of the thrust-reversing flaps in flight or while landing before actually running on the ground, would give rise to a breaking jolt that could lead to total loss of control of the aircraft, thereby causing the aircraft to crash.

An object of the invention is to provide a locking device providing a very high level of safety, in particular in the event of failure of the tilting hook latch.

Another object of the invention is to provide a locking device whose structure is simple and compact, in particular so as to enable it to be used for locking the thrust-reversing flaps of aircraft jets.

SUMMARY OF THE INVENTION

More particularly, the present invention provides a locking device comprising a box, a primary latch implemented in the form of a hook cantilevered out from a tilt axis carried by said box to enable the hook to tilt between an open position and a closed position in which said hook supports a first catch member, and a retractable locking member disposed to oppose tilting of the hook when said hook is in its closed position by a locking portion of said hook bearing directly against said locking member, wherein the locking device further comprises a secondary latch adjacent to the primary latch and made in the form of a member that is slidably mounted in the box to slide between a retracted, open position and an extended, closed position in which said sliding member is in the direct vicinity of an associated second catch member.

In a preferred embodiment, the sliding member has a locking portion that mechanically locks the second catch member when it comes into contact therewith, and the means for actuating the primary latch and the secondary latch are organized in such a manner that the hook can tilt into its open position only after the sliding member has been retracted. A secondary latch is thus obtained which is self-locking, and that is particularly advantageous in the event of the hook and/or its tilt axis breaking.

Also preferably, the first and second catch members are made in the form of two catch rods that are parallel and adjacent to each other.

Although the two catch rods may be disposed in alignment with each other, it is advantageous to provide for the two catch rods to be offset perpendicularly to the sliding direction of the sliding member: each an offset makes it possible to provide a sliding member of large cross-section in order to obtain a sliding member that is mechanically very strong, without it being necessary to overdimension the box of the device.

Also advantageously, the sliding member is continuously subjected to the action of an associated spring tending to return said member towards its extended, closed position.

It is then preferable for the return spring to act directly on the end of an actuating pusher associated with the sliding member. In particular, the return spring may be housed in a cover fixed on the outside of the box, and the cover may also receive a return spring acting on the pusher for actuating the hook in such a manner that the retractable locking member bears against said hook.

Finally, and advantageously, the sliding member carries a contact co-operating with an associated detector member fixed to the box and serving to detect the extended or the retracted position of said sliding member.

BRIEF DESCRIPTION OF THE DRAWINGS

An embodiment of the invention is described by way of example with reference to the accompanying drawings, in which:

FIG. 1 is a section view through a locking device in accordance with the invention, said device being shown in its locking position with a hook and a sliding member that are both in their closed positions (with the open positions of the hook and of the sliding member being shown in chain-dotted lines);

FIGS. 2 to 5 are sections respectively on II—II, III—III, IV—IV, and V—V of FIG. 1 making it possible more clearly to distinguish the special structure of the hook and of the sliding member of the locking device;

FIG. 6 is a fragmentary view as seen along arrow VI making it possible more clearly to distinguish the dispositions of the two catch rods, which in this case are offset relative to each other;

FIG. 7 is a section on VII—VII of FIG. 1 showing the detector member associated with the sliding member;

FIG. 8 is a section on VIII—VIII of FIG. 7 showing the hook and its return spring which urges it against the associated retractable locking member; and FIG. 9 is a section on IX—IX of FIG. 4 showing the sliding member in its two positions, making it possible more clearly to distinguish the locking portion provided in this case for said sliding member so as to make it self-locking.

DETAILED DESCRIPTION

FIG. 1 shows a locking device 100 of the invention, which device comprises a box 101 mounted on a carrier plate 11 on a fixed structure 10. In the example shown of locking the thrust-reversing flaps of an aircraft jet, the locking device 100 serves to lock a thrust-reversing flap 12 whose untimely opening is to be avoided with total reliability.

The locking device 100 includes a primary latch 203 in the form of a hook 103 cantilevered out from a tilt axis 102 carried by the box 101. The hook 103 is said to be cantilevered out from its tilt axis 102 insofar as in the closed position the associated catch member 16 bearing against the hook 103 tends to cause the hook to tilt towards an open position in which the catch member escapes from said hook. As represented by arrow 104, the hook 103 can thus tilt between an open position (shown in chain-dotted lines) and a closed position in which said hook supports said first catch member 16. A retractable locking member 122 is also disposed inside the box 101 to oppose tilting of the hook 103 when said hook is in its closed position (the position shown in continuous lines in FIG. 1) by a locking portion 106 of said hook bearing directly against said locking member. In this case the retractable locking member 122 is in the form of a wheel pivotally mounted about an axis 122' on a fork 121. The actuator means 120 associated with said retractable locking means 122 is constituted, in this case, by a pusher 124 having one end 123 connected by a coupling means known per se to the fork 121 supporting the wheel 122. The other end of the pusher 124 is connected to a thrust washer 125 against which a return spring 126 acts, which spring thus acts on the actuating pusher 124 of the hook in such a manner that the retractable locking member 122 bears against said hook. The retractable locking member 122 bears via a cam surface 160 of curved shape when the hook is in its closed position, and against a second cam surface 161 which is also curved when said hook is in its open position.

As can be seen more clearly in FIG. 8, a resilient return member is provided, in this case in the form of a spring 135, urging the hook 103 towards its open position, such that the cam surface 160 or the cam surface 161 is kept constantly pressed against the wheel 122. In the example shown, the return spring 135 is engaged by means of hinged pegs 126 and 129 respectively mounted on the hook 103 and on a tab 101' secured to the box 101.

In accordance with an essential feature of the invention, the locking device 100 further includes a secondary latch 205 adjacent to the primary latch 203 and implemented in the form of a member 105 mounted slidably in the box 101. The sliding member 105 thus moves in an associated housing 106 of the box 101 between a retracted open position (shown in chain-dotted lines) and an extended closed position in which said sliding member is in the direct vicinity of a second associated catch member 18 (see also FIG. 9).

When the sliding member 105 is in its retracted position, it leaves room for the second catch member 18 associated therewith to pass. In contrast, when the sliding member is in its extended or closed position, a portion of its front end comes into the immediate vicinity of the second catch member 18: it is preferable for there to be no direct contact between the sliding member 105 and the associated second catch member 18 when the locking device is in its closed position. The secondary latch 105 is intended to act only should that be necessary, i.e. in the event of the primary tilting hook latch 203 failing. Thus, in the event of the hook 103 and/or its tilt axis 102 breaking, the thrust-reversing flap 12 can move slightly in its opening direction until the catch member 18 comes into abutment against the sliding member 105. The presence of sufficient clearance then makes it possible to use detection means to warn the pilot of failure of the primary latch.

As can be seen more clearly in the section of FIG. 9, the sliding member 105 in this case has a locking portion 108 which is curved so as to provide mechanical locking of the second catch member 18 when said locking portion is in contact with said catch member. It would naturally be possible to provide a contact face that is rectilinear, but as shown herein, the presence of a curved face makes it possible to obtain an extremely advantageous self-locking effect. If breakage occurs in the primary latch, and the catch member 18 then comes into contact with the sliding member 105, the curved surface 108 prevents said sliding member from retracting. As a result, it is then advantageous to provide for the actuating means of the primary latch 203 and of the secondary latch 205 to be organized so that the hook 103 can tilt into its open position only after the sliding member 105 has been retracted. A secondary latch that is self-locking is thus obtained, and this is particularly advantageous in the event of the hook and/or the tilt axis of said hook breaking.

As is visible in FIG. 1, the actuating means 130 associated with the secondary latch 205 comprise a pusher 132 whose end 131 is connected to the sliding member 105 by a quick connection system (analogous to that used for connection to the fork carrying the retractable locking member). The other end of the pusher 132 is connected to a thrust washer 133 which is constantly subjected to the action of an associated spring 134 urging the sliding member 105 towards its extended or closed position.

In this context, it is interesting to observe that like the return spring 126 associated with the actuating means for the retractable locking member, the return spring 134 is housed in a common cover 128 fixed on the outside of the box 101, thereby making it easy to inspect these two return springs. The cover 128 may also be provided with side windows (not shown) in order to enable the members of the locking device to be actuated manually in the event of general failure.

When the pilot acts on the locking device 100 to unlock the thrust-reversing flap 12, a fluidic control pulse is applied to the pusher 132 associated with the secondary latch 205, which pusher is in the form of a slide valve sliding in a bore 133 of the box 101, as can be seen in FIGS. 1 and 7.

FIG. 7 shows the admission end fitting 141 with the fluidic inlet being represented by arrow 200. When the pusher 132 has moved back far enough, a link duct 140 provided for this purpose may establish fluidic connection with the bore 141' of the box 101 in which the pusher 124 associated with the hook of the primary latch slides, which pusher is likewise made in the form of a slide valve. The second unlocking sequence then takes place, with the fork carrying the retractable locking member 122 retracting, said retraction being accompanied by the hook 103 tilting anticlockwise (under the action of associated return spring 135), and this continues until said hook reaches its open position where the cam surface 161 comes finally into contact with the wheel 122.

Once unlocking has been achieved, the fluidic feed to the device is automatically switched off such that the pushers 124 and 132 respectively associated with the hook 103 and with the sliding member 105 are subjected solely to the actions of their return springs 126 and 134: the hook 103 is then held in its open position (hook surface 161 against the wheel 122), and the sliding member 105 is returned to its extended or closed position.

On closing the flap, firstly the catch member 18 contacts the sloping end facet of the sliding member 105 to engage said catch member, and secondly the catch member 16 makes contact with the hook 103, thereby tilting it into its closed position (hook surface 160 in contact with the wheel 122): locking is thus performed automatically and by using purely mechanical means.

The catch members are constituted in this case in the form of two catch rods 16 and 18 which are parallel and adjacent to each other. The view of FIG. 2 thus makes it possible to distinguish the lateral disposition of the two catch members 16 and 18 which are respectively associated with the hook 103 and with the sliding member 105. Each of the catch rods 16 and 18 is held by webs 13, 14, and 15 forming a portion of a support gusset plate connected to the thrust-reversing flap 12.

The catch rods 16 and 18 could be in alignment; however it is advantageous for the two catch rods to be offset perpendicularly to the sliding direction of the sliding member 105 as can be seen more clearly in FIG. 6. The second catch member 18 associated with the sliding member 105 of the secondary latch is thus disposed at a higher level (in the figure), thereby making it possible to provide a sliding member whose cross-section is large, in order to achieve high mechanical strength for said sliding member, but without needing to overdimension the box of the locking device. Naturally the notion of an offset that is perpendicular to the sliding direction of the sliding member should be understood as a reference to said direction when the thrust-reversing flap is locked by the device 100.

FIGS. 3 to 5 enable the structural details of the primary latch and of the secondary latch in the locking device of the invention to be distinguished clearly.

In FIGS. 3 and 4, it is interesting to observe the presence of a plate 127 on which the fork 121 carrying the retractable locking member 122 slides. This plate could optionally be made of a material having a low coefficient of friction in order to avoid any risk of seizing in the sliding of the fork (e.g. it could be made of a plastic such as polytetrafluoroethylene). FIG. 5 clearly shows the pin 102 embodying the axis of the hook 103 and the associated bearing 102'.

FIGS. 1, 7 and 9 also make it possible to distinguish a tab 109 formed at the back of the sliding member 105, which tab has a contact 110 provided at the end thereof for co-operating with an associated detector member 150. The detector member 150 is visible in the section of FIG. 7, and said member is fixed to the box 101, e.g. by means of a nut 151, being disposed on the path of the contact 110 carried by the sliding member 105, so as to be able to detect whether said sliding member is in its extended position or its retracted position. This detector member is naturally connected to the surveillance and control center of the aircraft, with warning lights in the cockpit.

The invention is naturally not limited in any way to the embodiment described above, but on the contrary it extends to any variant that reproduces the essential characteristics specified above by equivalent means.

I claim:

1. A locking device comprising a box mounted on a first structure, a primary latch implemented in the form of a hook cantilevered out from a tilt axis carried by said box to enable the hook to tilt between an open position and a closed position in which said hook supports a first catch member mounted on a second structure to be locked with said first structure, and a retractable locking member disposed to oppose tilting of the hook when said hook is in its closed position by a locking portion of said hook bearing directly against said locking member, wherein the locking device further comprises a secondary latch adjacent to the primary latch and made in the form of a member that is slidably mounted in said box to slide between a retracted, open position and an extended, closed position in which said sliding member is in the direct vicinity of an associated second catch member, said second catch member being mounted on said second structure adjacent to said first catch member.

2. A locking device according to claim 1, wherein the sliding member has a locking portion that mechanically locks the second catch member when it comes into contact therewith, and wherein the means for actuating the primary latch and the secondary latch are organized in such a manner that the hook can tilt into its open position only after the sliding member has been retracted.

3. A locking device according to claim 1, wherein the first and second catch members are made in the form of two catch rods that are parallel and adjacent to each other.

4. A locking device according to claim 3, wherein the two catch rods are offset perpendicularly to the sliding direction of the sliding member.

5. A locking device according to claim 1, wherein the sliding member is continuously subjected to the action of an associated spring tending to return said member towards its extended, closed position.

6. A locking device according to claim 5, wherein the return spring acts directly on the end of an actuating pusher associated with the sliding member.

7. A locking device according to claim 6, wherein the return spring is housed in a cover fixed on the outside of the box.

8. A locking device according to claim 7, wherein the cover also receives a return spring acting on the pusher for actuating the hook in such a manner that the retractable locking member bears against said hook.

9. A locking device according to claim 1, wherein the sliding member carries a contact co-operating with an associated detector member fixed to the box and serving to detect the extended or the retracted position of said sliding member.

* * * * *